Patented Mar. 31, 1925.

1,531,913

UNITED STATES PATENT OFFICE.

LUTHER R. FERGUSON, OF HINTON, WEST VIRGINIA.

LUBRICANT.

No Drawing. Application filed August 4, 1923. Serial No. 655,744.

*To all whom it may concern:*

Be it known that I, LUTHER R. FERGUSON, a citizen of the United States, residing at Hinton, in the county of Summers and State of West Virginia, have invented certain new and useful Improvements in Lubricants; and I do hereby declare the following to be a full, clear, and exact description of the invention, such as will enable others skilled in the art to which it appertains to make and use the same.

This invention relates to a lubricant compound.

It is aimed to provide such a compound in which the lubricant forming the base, either an oil or grease, is considerably increased in volume and in lubricating and wear-resisting qualities, has a better body especially for use where the lubricated parts are worn, and which reduces friction and heating of the parts to a minimum.

In practicing the invention, to a suitable quantity of lubricant, usually a mineral or hydrocarbon oil or grease is thoroughly admixed with soft or bituminous coal in a dust or pulverized state. The lubricant consisting of the oil or grease and the coal dust are preferably in equal parts by volume but of course may be varied according to conditions.

The coal dust may be pulverized to any desired degree but at the present time I prefer to use a dust which sifts through a screen of approximately one hundred meshes to the square inch.

In the case of the lubricant prepared with the grease as a base, the product is of such consistency that it is quite similar to pliable clay or wax which enables it to be readily formed into cartridges or blocks against danger of melting at normal atmospheric temperatures and which enables it to be, in this condition, either wrapped in paper or the like or left exposed, in order to avoid the necessity of placing it in cans or cartons.

Changes may be resorted to within the spirit and scope of the invention.

I claim as my invention:—

1. A lubricating compound consisting of a lubricant and pulverized bituminous coal.

2. A lubricating compound consisting of a lubricant and pulverized bituminous coal in substantially equal parts by volume.

3. A lubricating compound consisting of grease and pulverized soft coal providing a product of substantially the same consistency as pliable clay, the grease and coal being substantially in equal parts by volume.

In testimony whereof I affix my signature in presence of two witnesses.

LUTHER R. FERGUSON.

Witnesses:
ROBT. R. KEELER,
W. T. FERGUSON.